United States Patent

Miyata

(10) Patent No.: US 9,343,867 B2
(45) Date of Patent: May 17, 2016

(54) GAS LASER SYSTEM RE-ACTIVATABLE WITHOUT ANY DAMAGE WITHIN SHORT TIME DURING RECOVERY OF POWER SUPPLY

(71) Applicant: FANUC CORPORATION, Minamitsuru-gun, Yamanashi (JP)

(72) Inventor: Ryusuke Miyata, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/609,149

(22) Filed: Jan. 29, 2015

(65) Prior Publication Data

US 2015/0222076 A1 Aug. 6, 2015

(30) Foreign Application Priority Data

Jan. 31, 2014 (JP) .................................. 2014-017768

(51) Int. Cl.
*H01S 3/097* (2006.01)
*H01S 3/134* (2006.01)
*H01S 3/036* (2006.01)

(52) U.S. Cl.
CPC ............ *H01S 3/09702* (2013.01); *H01S 3/134* (2013.01); *H01S 3/036* (2013.01)

(58) Field of Classification Search
CPC ...... H01S 3/09702; H01S 3/134; H01S 3/036
USPC ...................................................... 372/55–58
See application file for complete search history.

(56) References Cited

U.S. PATENT DOCUMENTS 7,586,969 B2 * 9/2009 Egawa .................... H01S 3/104
372/55

FOREIGN PATENT DOCUMENTS

| CN | 101207261 | 6/2008 |
| CN | 102214889 | 10/2011 |
| JP | 05000199 | 1/1993 |
| JP | 2737177 B | 4/1998 |
| JP | 2003152250 | 5/2003 |

* cited by examiner

*Primary Examiner* — Dung Nguyen
(74) *Attorney, Agent, or Firm* — RatnerPrestia

(57) ABSTRACT

A gas laser system including a laser oscillator including a device which needs a predetermined standby time until normally starting an operation after stopping an operation due to reduction of a power supplied from a power source unit, a controller, a power reduction detection unit, and a nonvolatile storage unit storing time data of a first time point when the reduction of the supplied power is detected by the power reduction detection unit. The controller calculates an operation stop time of the device, based on time from the first time point to a second point time when a next system activation command is output, and inhibits operation resumption of the device when the operation stop time is within a predetermined standby time.

6 Claims, 5 Drawing Sheets

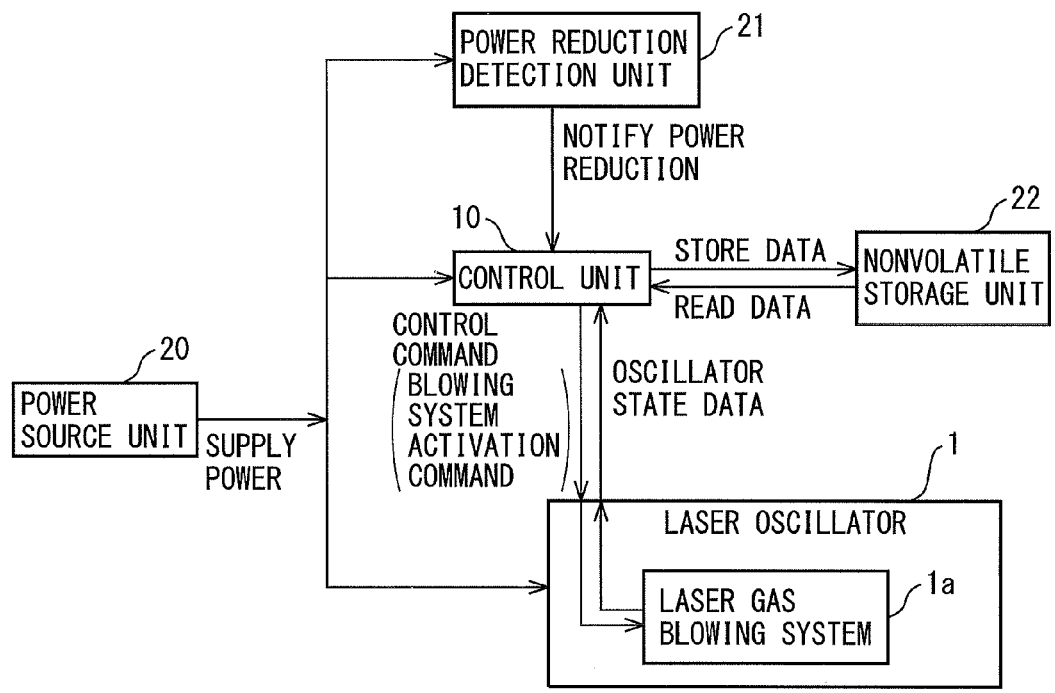
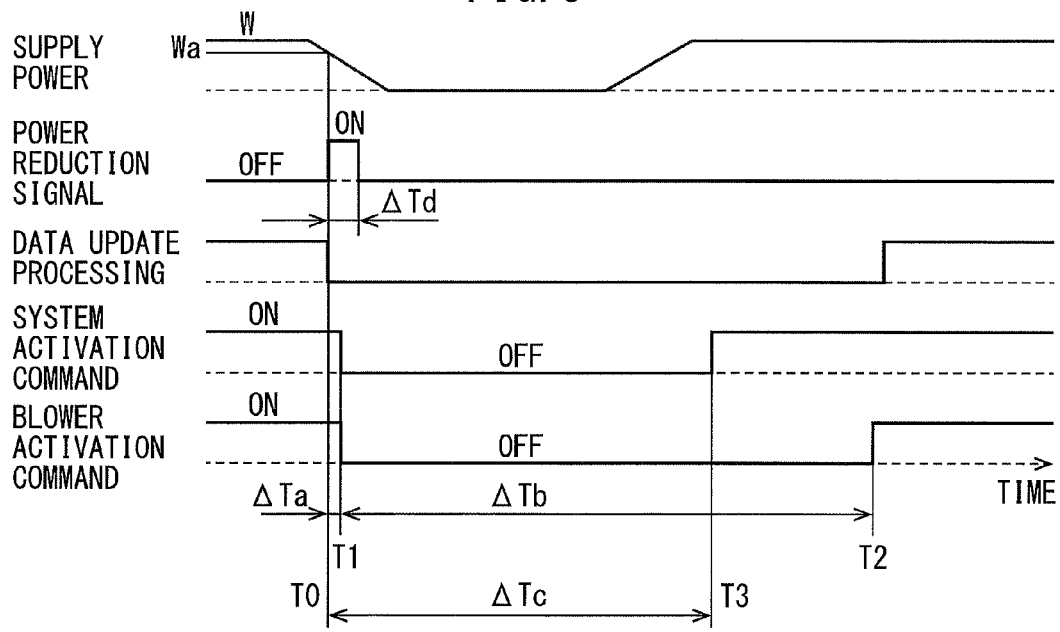

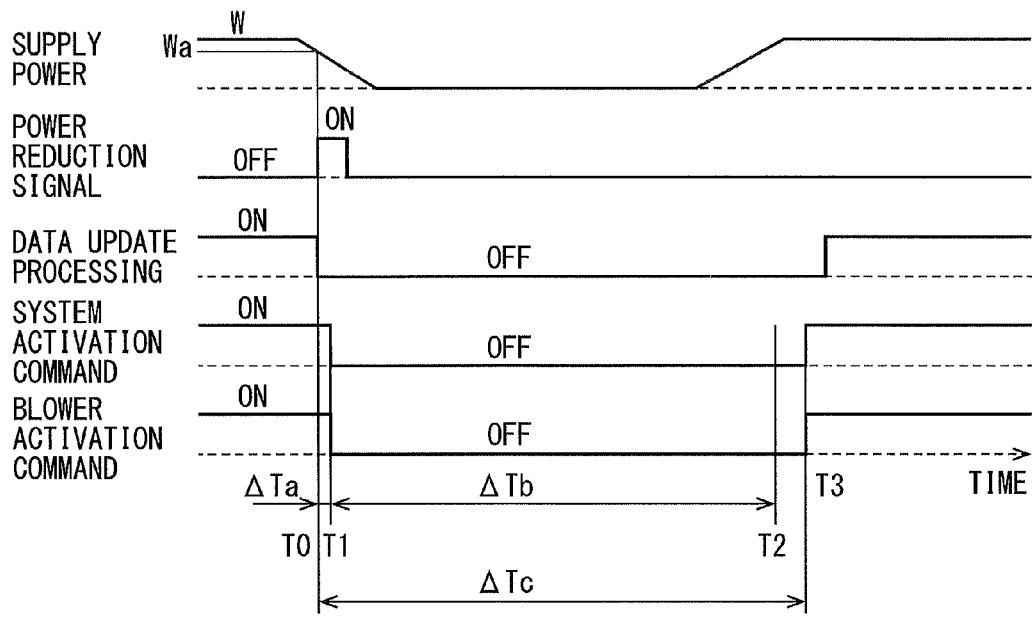
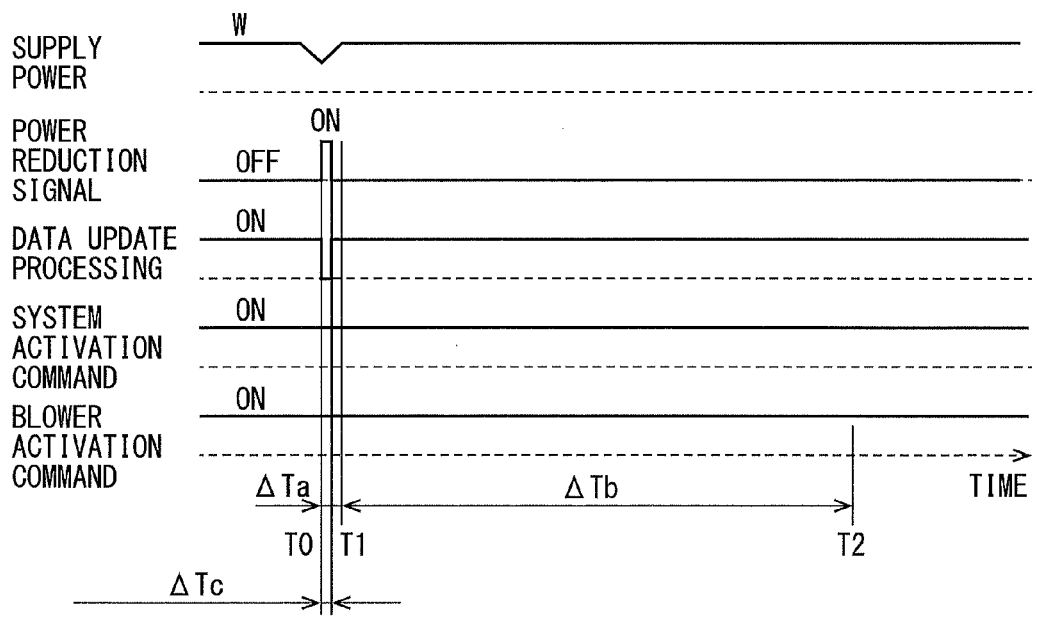

GAS LASER SYSTEM RE-ACTIVATABLE WITHOUT ANY DAMAGE WITHIN SHORT TIME DURING RECOVERY OF POWER SUPPLY

BACKGROUND OF THE INVENTION

1. Field of the Invention

The present invention relates to a gas laser system re-activatable without any damage within a short time during recovery of power supply after the power supply has been interrupted due to a blackout or the like.

2. Description of the Related Art

Generally, a gas laser oscillator is activated after laser gas exchanging in the laser oscillator. In order to shorten time for activating the laser oscillator, a method for skipping a part of a laser gas exchanging process at the time of activation under certain conditions is described in, for example, Published Japanese Patent No. 2737177 (JP2737177B). According to the method described in JP2737177B, a part of the laser gas exchanging process is skipped when an operation stop time of the laser oscillator is within a given time or a gas temperature in the laser oscillator is equal to or higher than a given temperature after the operation of the laser oscillator has been stopped.

JP2737177B offers a method concerning re-activation after the stopping operation of the laser oscillator has been normally carried out. Consequently, for example, when power is undesirably cut off due to a blackout or the like, the method described in JP2737177B cannot be applied. Moreover, when the power is cut off due to the blackout or the like, if time until re-activation is excessively short, some devices constituting the gas laser system may be damaged.

SUMMARY OF THE INVENTION

According to a first aspect of the present invention, a gas laser system includes a power source unit, a laser oscillator operated by power supplied from the power source unit and including a device, a predetermined standby time being needed until the device normally starts an operation after the device stops the operation due to reduction of the power supplied from the power source unit, a controller configured to control the laser oscillator, a power reduction detection unit configured to detect the reduction of the power supplied from the power source unit, in which the power is lowered than a power value operable normally the laser oscillator, and a nonvolatile storage unit configured to store time data of a first time point when the reduction of the supplied power is detected by the power reduction detection unit. The controller calculates an operation stop time of the device, based on time from the first time point acquired from the time data stored in the nonvolatile storage unit to a second time point when a next system activation command is output, permits operation resumption of the device when the operation stop time exceeds the predetermined standby time, and inhibits the operation resumption of the device when the operation stop of time is within the predetermined standby time.

According to another aspect of the present invention, a gas laser system includes a power source unit, a laser oscillator operated by power supplied from the power source unit, a device operated by the power supplied from the power source unit, a predetermined standby time being needed until the device normally starts an operation after the device stops the operation due to reduction of the power supplied from the power source unit, a controller configured to control the laser oscillator and the device, a power reduction detection unit configured to detect the reduction of the power supplied from the power source unit, in which the power is lowered than a power value operated normally the laser oscillator, and a nonvolatile storage unit configured to store time data of a first time point when the reduction of the supplied power is detected by the power reduction detection unit. The controller calculates an operation stop time of the device, based on time from the first time point acquired from the time data stored in the nonvolatile storage unit to a second time point when a next system activation command is output, permits operation resumption of the device when the operation stop time exceeds the predetermined standby time, and inhibits the operation resumption of the device when the operation stop time is within the predetermined standby time.

BRIEF DESCRIPTION OF THE DRAWINGS

The above objects, features, and advantages of the present invention will become more apparent from the following detailed description of the exemplary embodiments taken in connection with the accompanying drawings, in which:

FIG. 2 is a block diagram schematically illustrating a configuration of the gas laser system according to the embodiment of the present invention;

FIG. 3 is a time chart illustrating a main operation of the gas laser system according to the embodiment of the present invention;

FIG. 4 is a time chart illustrating an operation different from that illustrated in FIG. 3;

FIG. 5 is a time chart illustrating an operation different from those illustrated in FIGS. 3 and 4;

DETAILED DESCRIPTION

Figure 1:
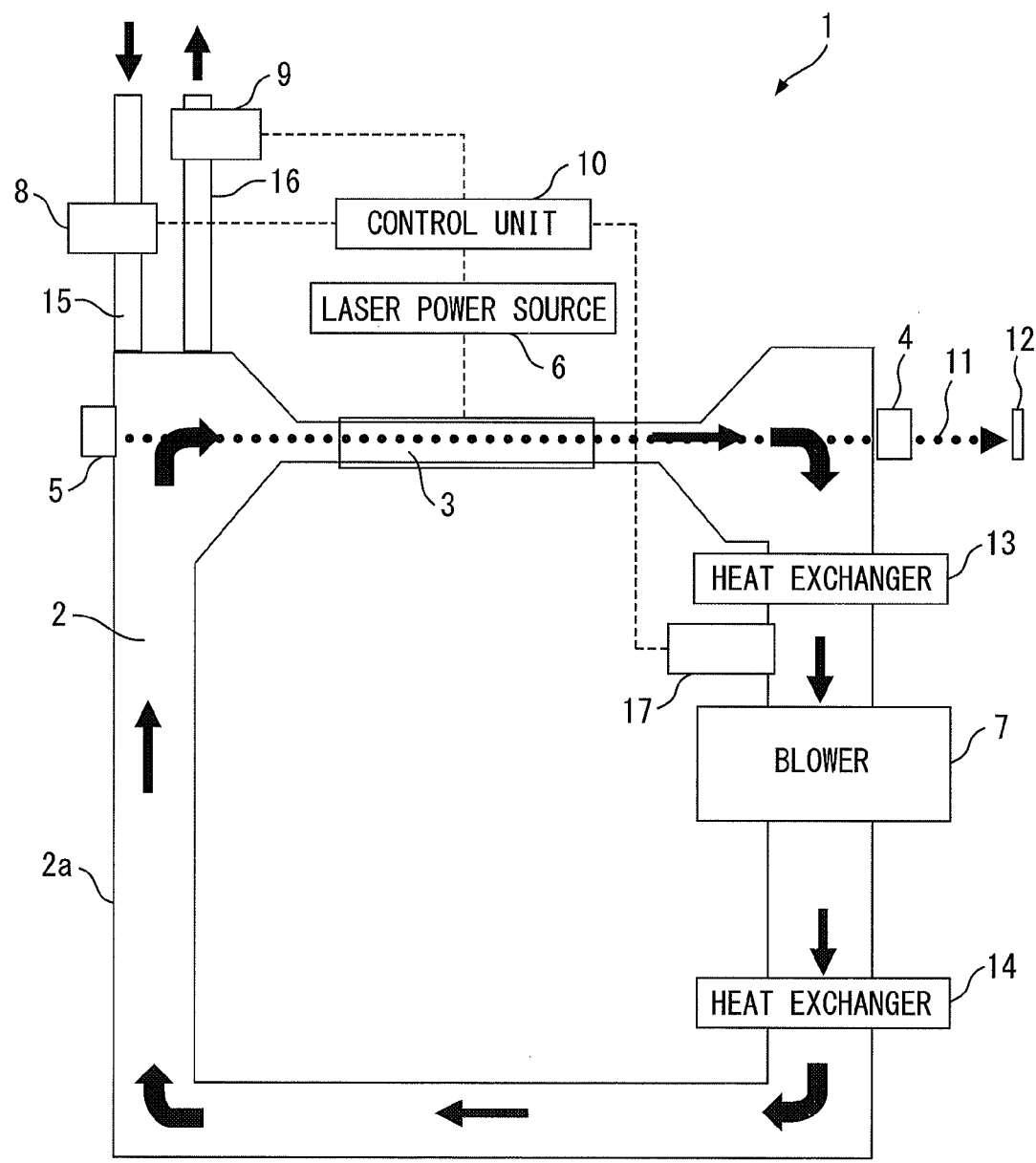
FIG. 1 is a diagram schematically illustrating a configuration of a laser oscillator constituting a gas laser system according to an embodiment of the present invention.

Hereinafter, the embodiments of the present invention will be described referring to FIGS. 1 to 8. FIG. 1 is a diagram schematically illustrating a configuration of a laser oscillator 1 constituting a gas laser system according to an embodiment of the present invention. The gas laser system according to the embodiment is applicable in a wide range of fields such as processing, medicine, and measurement.

As illustrated in FIG. 1, the laser oscillator 1 includes a gas flow path 2 through which laser gas circulates, a discharge tube 3 communicated with the gas flow path 2, an output mirror 4 and a rear mirror 5 arranged to sandwich the discharge tube 3, a laser power source 6 configured to apply a voltage (discharge tube voltage) to the discharge tube 3, a blower 7 configured to circulate the laser gas along the gas flow path 2, an air supply device 8 configured to supply the laser gas to the flow path 2, and an exhaust device 9 configured to discharge the laser gas from the gas flow path 2.

The gas flow path 2 is formed by using a laser gas container 2a. The laser gas container 2a is a sealed vacuum container. Predetermined laser gas is stored in the laser gas container 2a in an isolated state from the atmosphere. For the laser gas, a laser oscillation medium gas including a laser medium, such as carbon dioxide, nitrogen gas, or argon gas, is used.

The laser power source 6 is connected to a power source unit 20 of the gas laser system illustrated in FIG. 2 so as to supply power from the power source unit 20 to the laser power source 6. A control unit 10 includes an arithmetic processing unit which includes a central processing unit (CPU), a read-only memory (ROM), a random access memory (RAM), and other peripheral circuits, and controls power supplied from the laser power source 6 to the discharge tube 3. After the power is supplied from the laser power source 6 to the discharge tube 3, in other words, after the discharge tube voltage is applied, the laser gas is excited during passage through the discharge tube 3, resulting in a laser active state. Light generated by the discharge tube 3 is amplified between the output mirror 4 and the rear mirror 5, and a part thereof is output as a laser beam 11 from the output mirror 4. The laser beam 11 is passed through an openable/closable shutter 12 to be applied to an object.

The blower 7 includes a blower driving electric motor (hereinafter, referred to as a blower motor), and a fan or a blower driven by the blower motor. Power is supplied from the power source unit 20 illustrated in FIG. 2 to the blower 7 via a blower inverter (not illustrated). The blower 7 is rotated by this power to circulate the gas laser along the gas flow path 2. The power source unit 20, the blower inverter, and the blower motor constitute a blower driving electric circuit (blower circuit), and the blower 7 is rotated by power supplied via the blower circuit.

First and second heat exchangers 13 and 14 are respectively arranged on the gas flow path 2 on upstream and downstream sides of the blower 7. A predetermined refrigerant (e.g., cooling water) is supplied to each of the heat changers 13 and 14. The laser gas is cooled during passage through the heat exchangers 13 and 14 by heat-exchanging with the heat, and maintained at a predetermined temperature.

An air supply flow path 15 and an exhaust flow path 16 are connected to the gas flow path 2. The air supply device 8 is disposed in the air supply flow path 15, and the exhaust device 9 is disposed in the exhaust flow path 16. The air supply device 8 includes an openable/closable air supply valve, while the exhaust device 9 includes an openable/closable exhaust valve and a vacuum pump. The air supply device 8 and the exhaust device 9 are controlled using signals from the control unit 10.

A high-pressure tank (not illustrated) in which the laser gas has been stored is connected to the air supply flow path 15. Accordingly, when the air supply valve is opened, the laser gas is supplied from the tank to the gas flow path 2 via the air supply valve. On the other hand, when the exhaust valve is opened to drive the vacuum pump, the laser gas is discharged from the gas flow path via the exhaust valve. When the air supply valve and the exhaust valve are closed, the gas flow path is set in a sealed state.

During laser oscillation, the laser gas is supplied to or discharged from the gas flow path 2 via the air supply flow path 15 or the exhaust flow path 16, and the laser gas in the laser gas container 2a is replaced by a small amount. A gas pressure detector 17 is disposed on the downstream side of the first heat exchanger 13 and the upstream side of the blower 7, and gas pressure in the laser gas container 2a is detected by the gas pressure detector 17. The control unit 10 outputs a control signal to the blower 7, the air supply device 8, and the exhaust device 9 based on a detected value by the gas pressure detector 17 to control the gas pressure in the laser gas container 2a to predetermined gas pressure.

When activation of the laser oscillator 1 configured as described above is instructed, the laser oscillator 1 performs a predetermined preparatory operation according to a command from the control unit 10, and then starts a discharging operation. The preparatory operation includes, for example, a step of discharging the gas from the laser gas container 2a by the exhaust device 9, and a step of supplying laser gas of predetermined pressure into the laser gas container 2a by the air supply device 8 after the discharging step. The gas in the laser gas container 2a is replaced by the preparatory operation. The air supply step may be started before completion of the discharging step.

On the other hand, when the operation of the laser oscillator 1 is normally stopped after the completion of the discharging, the laser oscillator 1 performs a predetermined normal stopping operation based on a command from the control unit 10. The normal stopping operation includes a step of closing the air supply valve of the air supply device 8 and the exhaust valve of the exhaust device 9, and a step of stopping driving of the vacuum pump and the blower 7, and ends in a state where the laser gas container 2a is filled with laser gas of pressure higher than atmospheric pressure. This prevents atmosphere from flowing into the gas flow path 2 after the operation of the laser oscillator 1 has been stopped.

When the laser oscillator 1 is re-activated based on an input of an activation command after the normal stopping operation, the control unit 10 determines whether an operation stop time is within a predetermined time or not. This determination is for determining whether the laser gas in the laser gas container 2a is maintained in a predetermined state or not. In other words, when the operation stop time is within the predetermined time, determining that there is no atmosphere flowing into the gas flow path 2 nor laser gas leaked from the gas flow path 2, it is determined that the laser gas in the gas flow path 2 is maintained in a predetermined state.

When the operation stop time is within the predetermined time, the laser oscillator 1 skips a part (e.g., laser gas replacement) or all of the preparatory operation based on a command from the control unit 10 to start discharging. This shortens time for activating the laser oscillator 1 to enable resumption of the discharging within a short time. As long as it can be determined that the laser gas pressure in the laser gas container 2a is maintained in a predetermined state, not the operation stop time but another parameter (e.g., temperature or pressure of laser gas in laser gas container 2a) may be used as a criteria for determining.

For example, when a blackout occurs during the operation of the laser oscillator 1 in a region where a power condition is poor, power supplied to the laser oscillator 1 is cut off, and the operation of the laser oscillator 1 is stopped without any normal stopping operation thereof. Then, when re-activation of the laser oscillator 1 is instructed before an enough stop time elapses, some devices (e.g., blower 7) constituting the laser oscillator 1 may be damaged.

In other words, since the blower 7 is controlled to rotate by the blower inverter, when an output from the blower inverter stops due to the blackout, the blower motor is set in a free-run state, and the blower 7 continues to rotate through inertia. When re-activation of the blower 7 is instructed after power recovery, since the rotation speed of the blower motor and a control rotation speed greatly differ from each other, excess current or excess voltage is generated in the blower circuit, or current or voltage in the blower circuit suddenly changes. As a result, the blower 7 may be damaged or the blower circuit may fail. In order to prevent this situation, according to the first embodiment, the laser system is configured as follows.

FIG. 2 is a block diagram schematically illustrating a configuration of the gas laser system according to the embodiment of the present invention. As illustrated, a laser gas blowing system 1a of the laser oscillator 1 includes a configuration concerning blowing of the laser gas through the gas flow path 2, specifically, the blower 7 (blower motor) and the gas pressure detector 17. FIG. 2 mainly illustrates a configuration concerning control of the laser gas blowing system 1a.

As illustrated in FIG. 2, the laser oscillator 1, the control unit 10, and a power reduction detection unit 21 are connected to the power source unit 20 of the gas laser system. A nonvolatile storage unit 22 is connected to the control unit 10. The nonvolatile storage unit 22 includes a nonvolatile memory such as an electrically erasable programmable read-only memory (EEPROM). Data is stored in the nonvolatile storage unit 22 and the data stored in the nonvolatile storage unit 22 is read according to a command from the control unit 10. The nonvolatile storage unit 22 can be installed in the control unit 10.

The laser oscillator 1 is connected to the control unit 10, and oscillator state data indicating a state of the laser oscillator 1 is input to the control unit 10. The oscillator state data includes gas pressure data detected by the gas pressure detector 17, and time data, and is input to the control unit 10 at a predetermined interval (e.g., several milliseconds). The oscillator state data input to the control unit 10 is stored in the nonvolatile storage unit 22 according to a command from the control unit 10. At this time, when the oscillator state data has been stored in the nonvolatile storage unit 22, the data is overwritten to update the stored data. In other words, the control unit 10 executes data update processing of the nonvolatile storage unit 22. Thus, latest oscillator state data is stored in the nonvolatile storage unit 22.

The power reduction detection unit 21 includes a voltmeter, and is configured to detect reduction of the power supplied from the power source unit 20, in other words, reduction of supplied power W to a predetermined value Wa or lower. The predetermined value Wa corresponds to, for example, power at the occurrence of a blackout, and whether the blackout has occurred or not is detected by the power reduction detection unit 21. In other words, the predetermined value Wa is a power level enabling a normal operation of the laser oscillator 1, and the power reduction detection unit 21 detects power reduction in which the power is lowered than the power value Wa enabling the normal operation of the laser oscillator 1. As the power level enabling the normal operation, the predetermined value Wa may be set to a lower limit value of power (e.g., voltage) enabling the laser oscillator 1 to execute discharging, or a value obtained by providing a predetermined amount of margin to the lower limit value (e.g., lower limit value×10%). The power reduction detection unit 21 is connected to the control unit 10, and the reduction of the power (power reduction signal) detected by the power reduction detection unit 21 is notified to the control unit 10.

A main operation of the gas laser system according to the embodiment of the present invention will be described with reference to time charts of FIGS. 3 to 5. As illustrated in FIG. 3, the supplied power W from the power source unit 20 during the operation of the laser oscillator 1 is larger than the predetermined value Wa. At this time, the control unit 10 executes data update processing at a predetermined interval, and stores oscillator state data in the nonvolatile storage unit 22. In this state, a system activation command is ON, and an activation command of the blower 7 is also ON. The system activation command is a command permitting activation of the laser gas system. When power of the laser gas system is turned off, the control unit 10 turns off the system activation command before the power-off, and requests power-off of the laser gas system.

When a blackout occurs during the operation of the laser oscillator 1, the power W supplied from the power source unit 20 is reduced, and the power reduction detection unit 22 outputs a power reduction signal (ON signal) at a time point T0. The control unit 10 stops the data update processing when receiving the power reduction signal from the power reduction detection unit 22. Accordingly, oscillator state data (gas pressure data) including time data of the time point T0 of detecting the reduction of the supplied power is stored in the nonvolatile storage unit 22.

Until predetermined time $\Delta Ta$ (e.g., 500 milliseconds) elapses from the output of the power reduction signal, the control unit 10 continues to output a system activation command. At a time point T1 when the predetermined time $\Delta Ta$ elapses from the time point T0, the control unit 10 determines that the power supply may not be recovered quickly, and turns off the system activation command, and stops (turns off) the activation command of the blower 7. This stops the power supply from the blower inverter to the blower motor to set the blower 7 in a free-run state. The predetermined time $\Delta Ta$ indicates the time (activation stop determination time) for determining whether or not to turn off the system activation command, and is set in advance to time shorter than time ($\Delta Td$ illustrated in FIG. 3) from the reduction of the supplied power to complete cutting-off of the supplied power.

The ROM of the control unit 10 stores standby time $\Delta Tb$ necessary from the stop of the activation command of the blower 7 to normal re-activation of the blower 7 in advance. The standby time $\Delta Tb$ corresponds to, for example, time until the inertially rotated blower 7 comes to a complete stop, and time from a time point T1 to a time point T2 illustrated in FIGS. 3 and 4 represents the standby time $\Delta Tb$.

Time until a system activation command is output after recovery from the reduction of the power supply, in other words, time $\Delta Tc$ from a time point T0 to a time point T3, is supplied power reduction detection time. The supplied power reduction detection time $\Delta Tc$ is acquired from time data of the time point T0 stored in the nonvolatile storage unit 22. After the recovery, the control unit 10 turns on the system activation command at the time point T3 to read the time data of the time point T0 from the nonvolatile storage unit 22. The control unit 10 calculates time obtained by subtracting the time point T0 from the current time point T3 as the supplied power reduction detection time $\Delta Tc$. The control unit 10 subtracts the activation stop determination time $\Delta Ta$ from the supplied power reduction detection time $\Delta Tc$ to calculate an operation stop time ($\Delta Tc - \Delta Ta$) of the blower 7, and determines which is longer and shorter, the operation stop time ($\Delta Tc - \Delta Ta$) or the standby time $\Delta Tb$. Timing (time point T3) at which the control unit 10 outputs a next system activation command can be arbitrarily set. The control unit 10 can output the system activation command simultaneously with the recovery from the power-off, immediately after the recovery, or after a lapse of predetermined time from the recovery.

As illustrated in FIG. 3, when the operation stop time ($\Delta Tc - \Delta Ta$) is shorter than the standby time $\Delta Tb$ at the system activation command time (time point T3), the control unit 10 stands by without outputting any activation command of the blower 7. When the operation stop time ($\Delta Tc - \Delta Ta$) reaches the standby time $\Delta Tb$ at the time point T2, the control unit 10 outputs a blower activation command. Accordingly, since the blower activation command is output in the stopped state of the blower 7, excessive current or an excessive voltage can be prevented from being generated in the blower circuit, and the blower 7 can be re-activated well.

On the other hand, as illustrated in FIG. 4, when the operation stop time (ΔTc−ΔTa) is longer than the standby time ΔTb, the control unit 10 turns on the system activation command at the time point T3, and turns on the blower activation command. Thus, the blower 7 can be quickly re-activated at the recovery time of power, and the laser gas system can be efficiently recovered.

As illustrated in FIG. 5, when power is recovered within the activation stop determination time ΔTa, the control unit 10 turns on data update processing. In this case, the system activation command is kept ON, and the blower activation command is also kept ON. Accordingly, when power is quickly recovered after a blackout, since activation of the blower 7 is not stopped, the blower 7 can be continuously operated in a stable state.

When the blower activation command is turned on at the time point T2 illustrated in FIG. 3 or the time point T3 illustrated in FIG. 4, the control unit 10 reads gas pressure data (oscillator state data) stored in the nonvolatile storage unit 22, and controls gas pressure in the gas flow path 2 to target gas pressure suited to discharging by using the gas pressure data. For example, through PID control, the gas pressure of laser gas is controlled to the target gas pressure. Thus, by using the gas pressure data at the time of the blackout occurrence, the gas pressure in the gas flow path 2 can be quickly controlled to the target gas pressure. The control unit 10 inhibits a discharging operation of the laser oscillator 1 until the gas pressure is stabilized to the target gas pressure. After the gas pressure is stabilized to the target gas pressure, the control unit 10 permits the discharging operation of the laser oscillator 1. As a result, the discharging operation of the laser oscillator 1 can be performed well.

The embodiment of the present invention can provide the following effects.

(1) The gas laser system includes the power source unit 20, the laser oscillator 1 operated by power supplied from the power source unit 20, the control unit 10 configured to control the laser oscillator 1, the power reduction detection unit 21 configured to detect the reduction of the power supplied from the power source unit 20, i.e., the reduction in which the power is lowered than the power value Wa enabling the normal operation of the laser oscillator 1, and the nonvolatile storage unit 22 configured to store the time data of the time point T0 when the reduction of the supplied power is detected by the power reduction detection unit 21. The laser oscillator 1 includes the blower 7 which needs the predetermined standby time ΔTb until the start of the normal operation after the operation is stopped due to the reduction of the power supplied from the power source unit 20. The control unit 10 acquires, after the power source unit 20 is from the time point T0 acquired from the time data stored in the nonvolatile storage unit 22, the reduction detection time ΔTc of the supplied power until the time point T3 when the next system activation command is output, subtracts the activation stop determination time ΔTa from the supplied power reduction detection time ΔTc to calculate the operation stop time (ΔTc−ΔTa) of the blower 7, outputs the blower activation command when the operation stop time (ΔTc−ΔTa) exceeds the standby time ΔTb, and stops the output of the blower activation command when the operation stop time (ΔTc−ΔTa) is within the standby time ΔTb. As a result, excessive current or an excessive voltage can be prevented from being generated in the blower circuit when the blower 7 is re-activated after the blackout, and the blower 7 can be re-activated well.

(2) The control unit 10 turns off the blower activation command after the lapse of the predetermined time ΔTa from the detection of the reduction of the supplied power by the power reduction detection unit 21. Thus, when the power is quickly recovered after the blackout, the blower 7 continues to operate, and the gas laser system can be operated in a stable manner.

(3) The nonvolatile storage unit 22 stores not only the time data of the time point T0 when the supplied power is reduced but also the gas pressure data detected by the gas pressure detector 17 as the oscillator state data. Thus, the gas state of the laser gas at the time of the blackout can be understood, and the gas pressure control during the recovery can be efficiently performed.

(4) The nonvolatile storage unit 22 stores the gas pressure at the time point T0 detected by the gas pressure detector 17, and the control unit 10 controls, based on the stored gas pressure, the gas pressure to the target gas pressure after the recovery of the supplied power from the power source unit 20. Accordingly, the gas pressure in the gas flow path 2 can be quickly controlled to the target gas pressure. Since the control unit 10 permits the discharging operation of the laser oscillator 1 after the gas pressure is controlled to the target gas pressure, the discharging operation of the laser oscillator 1 can be performed well.

(5) The control unit 10 cancels the data update processing in the nonvolatile storage unit 22 when the power reduction signal is output from the power reduction detection unit 21. Thus, oscillator state data during the normal operation before the gas pressure state or the like changes can be stored in the nonvolatile storage unit 22. On the other hand, when the power supply to the control unit 10 is cut off after the blackout, the data update processing is canceled even without any command from the control unit 10. In this case, however, time has elapsed from the blackout, and there is a possibility that the oscillator state data to be stored may not be normal.

Figure 6:
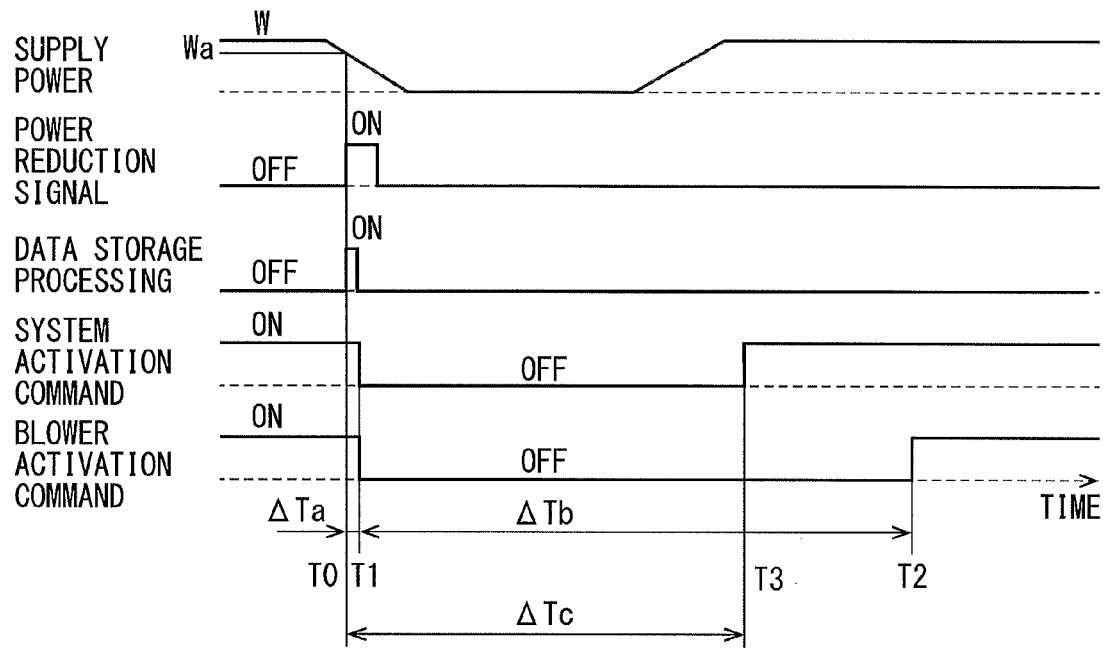
FIG. 6 is a time chart illustrating a modified example of FIG. 3.

In the embodiment, the data update processing (storage processing) is carried out until the power reduction signal is output, and the gas pressure of the laser gas detected by the gas pressure detector 17 is periodically stored in the nonvolatile storage unit 22 together with the time data. However, as long as at least the time data of the time point T0 when the power reduction signal is output is stored, the oscillator state data may not be stored periodically. For example, as illustrated in FIG. 6, data storage processing may be executed at the time point T0 when the power reduction signal is output, and only the oscillator state data at the time point T0 may be stored. This reduces the number of processing times for storing data in the nonvolatile storage unit 22, and processing time at the control unit 10 can be shortened. As long as the nonvolatile storage unit 22 has an enough storage capacity, the oscillator state data may be periodically stored without being updated (overwritten). As a result, time-sequential oscillator state data can be acquired.

Figure 7:
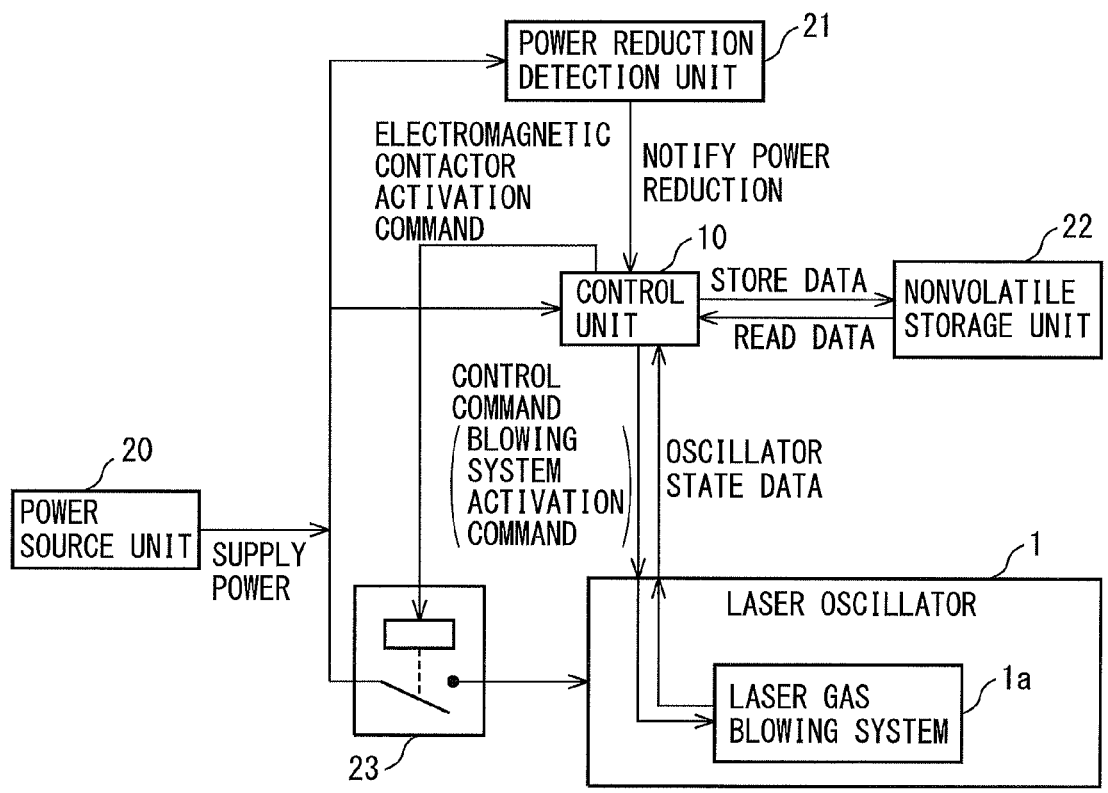
FIG. 7 is a block diagram illustrating a modified example of FIG. 2.

In the embodiment, the activation of the laser gas blowing system 1a in the laser oscillator 1 is controlled at the time of the blackout. However, activation of another device which needs the predetermined standby time ΔTb until a normal operation after the blackout may be controlled. FIG. 7 is a block diagram illustrating a control configuration of the gas laser system as an example thereof. In FIG. 7, an electromagnetic contactor 23 is disposed between the power source unit 20 and the laser oscillator 1 (laser power source 6), and the control unit 10 controls activation of not only the laser gas blowing system 1a (blower 7) but also the laser power source 6 via the electromagnetic contactor 23. The control unit 10 may control only the activation of the laser power source 6.

A contact of the electromagnetic contactor 23 is closed by an ON-command (activation command) from the control unit 10, so that the power source unit 20 and the laser gas oscillator 1 are communicated with each other, and permits power to be supplied from the power source unit 20 to the laser power source 6. On the other hand, the contact is opened by an OFF-command from the control unit 10, so that the communication between the power source unit 20 and the laser gas oscillator 1 are cut off, and the power supply from the power source unit 20 to the laser power source 6 is cut off. When the power supplied from the power source unit 20 is cut off during the operation of the laser gas oscillator 1, the contact of the electromagnetic contactor 23 is opened to cut off the power supply to the laser light source 6. As a result, charges stored in a capacitor (not illustrated) in the laser power source 6 are gradually discharged. When an ON-command is output to the electromagnetic contactor 23 to close the contact in a state where the amount of remaining charges is small, because of a large difference in potential between the power source unit 20 and the laser power source 6, large current flows from the power source unit 20 into the laser power source 6. This may cause the laser power source 6 to be damaged.

Meanwhile, the laser power source 6 includes a resistor and a relay contact (not illustrated). The relay contact is configured to automatically open when the charges stored in the capacitor in the laser power source 6 are discharged to a certain extent with time elapsed after the cutting-off of the power supplied from the power source unit 20. Accordingly, when the power is recovered in the opened state of the relay contact, current flows from the power source unit 20 to the capacitor of the laser power source 6 via the resistor, thereby preventing large current from flowing into the laser power source 6. In view of this point, predetermined standby time $\Delta Td$ is set in advance, and the control unit 10 controls the electromagnetic contactor 23 to inhibit an operation of the laser power source 6 until the standby time $\Delta Td$ elapses. The standby time $\Delta Td$ is time necessary from a discharging start of the capacitor of the laser power source 6 due to the reduction of the power supplied from the power source unit 20 to opening of the relay contact of the laser power source 6, in other words, time necessary until the laser power source 6 normally starts its operation. The standby time $\Delta Td$ is time unique to the laser power source 6, and different from the standby time $\Delta Tb$ of the blower 7. The standby time $\Delta Td$ and the standby time $\Delta Tb$ may be set to the same time. In this case, $\Delta Td$ and $\Delta Tb$ may be unified to longer standby time.

Figure 8:
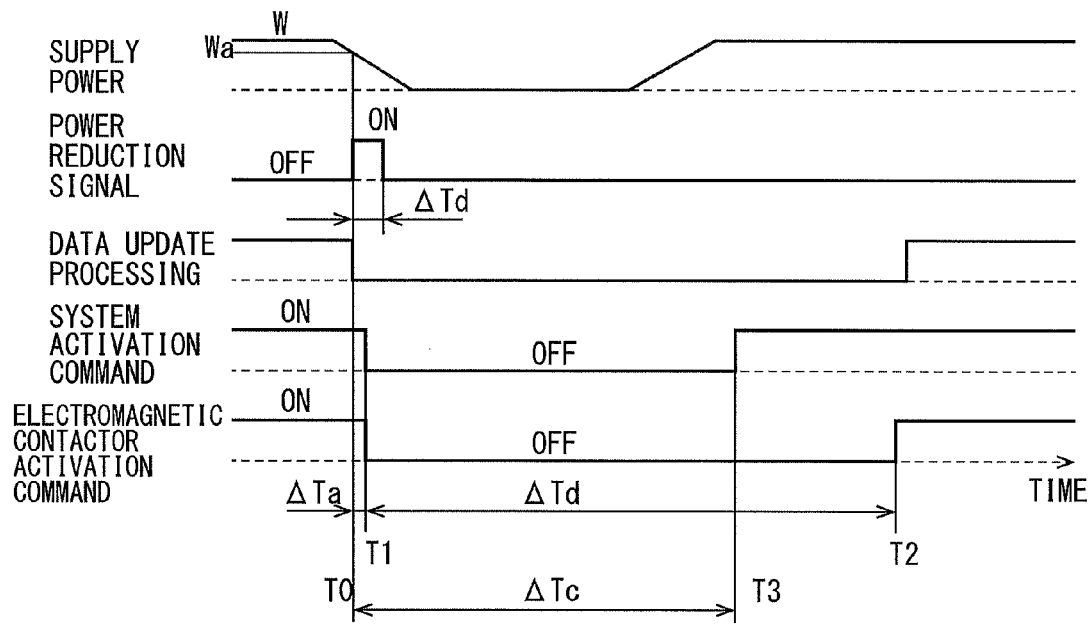
FIG. 8 is a time chart illustrating a main operation of a gas laser system illustrated in FIG. 7.

FIG. 8 illustrates a modified example of FIG. 3, and is a time chart illustrating an operation concerning activation of the electromagnetic contactor 23 in the gas laser system illustrated in FIG. 7. As illustrated in FIG. 8, the activation of the electromagnetic contactor 23 is controlled as in the case of the blower 7. Specifically, when a power reduction signal is output by the power reduction detection unit 21 at a time point T0, the control unit 10 turns off the electromagnetic contactor 23 at a time point T1 after activation stop determination time $\Delta Ta$ elapses. Then, even when a system activation command is turned on at a time point T3, the control unit 10 keeps OFF an activation command of the electromagnetic contactor 23 until standby time $\Delta Td$ elapses, and turns on the activation command of the electromagnetic contactor 23 at a time point T2 when the standby time $\Delta Td$ elapses. As a result, the laser power source 6 can be prevented from being damaged.

In the embodiments (FIGS. 2 and 7), as the devices which needs the predetermined standby time $\Delta Tb$ (first standby time) and the predetermined standby time $\Delta Td$ (second standby time) until the start of the normal operation after the operation is stopped due to the reduction of the power supplied from the power source unit 20, the blower 7 (first device) and the laser power source 6 (second device) have been described as examples. However, the devices are not limited to these. For other devices included in the laser oscillator 1 or other devices not included in the laser oscillator 1, standby time can be similarly set.

Figure 9:
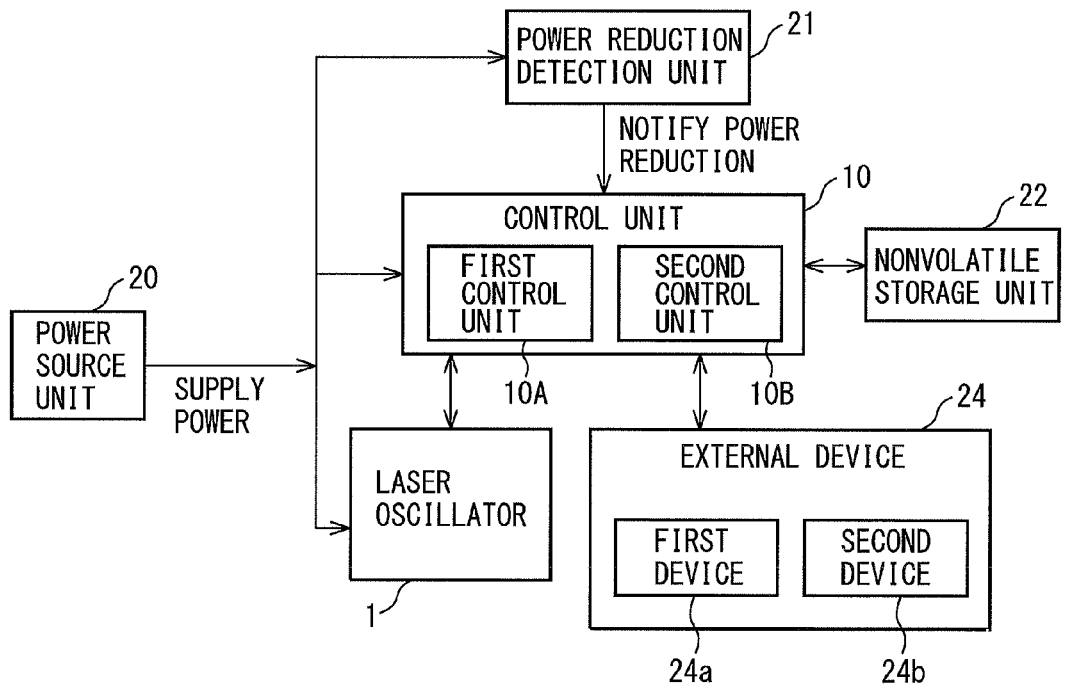
FIG. 9 is a block diagram illustrating a modified example of FIG. 2.

FIG. 9 is a block diagram illustrating a modified example of FIG. 2. A control unit 10 (controller) includes a first control unit 10A configured to control a laser oscillator 1, and a second control unit 10B configured to control an external device 24 not included in the laser oscillator 1. The external device 24 includes first and second devices 24a and 24b. The first and second devices 24a and 24b are operated by power supplied from a power source unit 20, and need predetermined standby time (e.g., $\Delta Tb$ and $\Delta Td$) from an operation stop due to reduction of the power supplied from the power source unit 20 to a start of a normal operation. The control unit 10B calculates, as in the case of the control unit 10 illustrated in FIG. 2, operation stop time ($\Delta Tc-\Delta Ta$) of the devices 24a and 24b based on time $\Delta Tc$ from a first time point T0 acquired from time data stored in a nonvolatile storage unit 22 to a second time point T3 when a next system activation command is output. The control unit 10B permits operation resumption of the device 24a when the operation stop time exceeds the predetermined standby time $\Delta Tb$, and permits operation resumption of the device 24b when the operation stop time exceeds the predetermined standby time $\Delta Td$. On the other hand, the control unit 10B inhibits the operation resumption of the device 24a when the operation stop time is within the predetermined standby time $\Delta Tb$, and inhibits the operation resumption of the device 24b when the operation stop time is within the predetermined standby time $\Delta Td$.

In the embodiment, the gas pressure of the laser gas is detected by the gas pressure detector 17. However, a physical amount detection unit may be provided which detects another physical amount indicating an operating state of the laser oscillator 1, and the detected physical amount may be stored in the nonvolatile storage unit 22 together with time data of a time point T0 (first time point) of detecting the reduction of the supplied power. Only the time data of the first time point T0 may be stored in the nonvolatile storage unit 22.

In the embodiments (FIGS. 2, 7, and 9), based on the reduction detection time $\Delta Tc$ of the supplied power from the first time point T0 acquired from the time data stored in the nonvolatile storage unit 22 to the second time point T3 when the next system activation command is output, the operation stop time of the device such as the blower 7, the laser power source 6, or the external device 24 is calculated. In other words, the predetermined activation stop determination time $\Delta Ta$ is subtracted from the reduction detection time $\Delta Tc$ of the supplied power to calculate the operation stop time ($\Delta Tc-\Delta Ta$) of the device. However, as long as the operation resumption of the device is permitted when the operation stop time exceeds the predetermined standby time, and inhibited when the operation stop time is within the predetermined standby time, any configuration of the control unit 10 as the controller illustrated in FIGS. 2 and 9, and any configurations of the control unit 10 as the controller and the electromagnetic contactor 23 illustrated in FIG. 7 may be employed. For example, when the reduction of the supplied power from the power source unit 20 is detected, the activation command of the device may be immediately turned off. In FIG. 7, the control unit 10 controls the activation of the laser power source 6 via the electromagnetic contactor 23. However, the control unit 10 may directly control the activation of the laser power source 6 not via the electromagnetic contactor 23. In FIGS. 3 and 8, the operation stop time ($\Delta Tc-\Delta Ta$) of the device at the time point T3 of recovering the power is illustrated. However, an amount is added to the operation stop time as time elapses. In other words, at a time point (e.g., time point between time points T3 and T2) after predetermined time $\Delta T$ elapses from the time point T3, an amount equivalent to this predetermined time is added to the operation stop time of the device, and the stop time is $\Delta Tc-\Delta Ta+\Delta T$.

One or a plurality of the embodiment and the modified examples can be arbitrarily combined.

According to the present invention, based on the time from the first time point acquired from the time data stored in the nonvolatile storage unit to the second time point for outputting the next system activation command, the operation stop time of the device is calculated, and the operation resumption of the device is inhibited when the operation stop time is within the predetermined standby time. As a result, damaging of the device caused by a short operation stop time can be prevented.

While the preferred embodiments of the present invention have been described, as obvious to those skilled in the art, various modifications and changes can be made without departing from the scope of the appended claims.

The invention claimed is:

1. A gas laser system comprising:
   a power source unit;
   a laser oscillator operated by power supplied from the power source unit and including a device, a predetermined standby time being needed until the device normally starts an operation after the device stops the operation due to reduction of the power supplied from the power source unit;
   a controller configured to control the laser oscillator;
   a power reduction detection unit configured to detect the reduction of the power supplied from the power source unit, in which the power is lowered than a power value operable normally the laser oscillator; and
   a nonvolatile storage unit configured to store time data of a first time point when the reduction of the supplied power is detected by the power reduction detection unit,
   wherein the controller calculates an operation stop time of the device, based on time from the first time point acquired from the time data stored in the nonvolatile storage unit to a second point time when a next system activation command is output, permits operation resumption of the device when the operation stop time exceeds the predetermined standby time, and inhibits the operation resumption of the device when the operation stop time is within the predetermined standby time.

2. The gas laser system according to claim 1, wherein the controller outputs an operation stop signal of the device when a predetermined time elapses from the detection of the reduction of the supplied power by the power reduction detection unit, and the operation stop time is measured from a time point of outputting the operation stop signal.

3. The gas laser system according to claim 1, further comprising
   a physical amount detection unit configured to detect a physical amount indicating an operating state of the laser oscillator,
   wherein the nonvolatile storage unit stores a physical amount detected by the physical amount detection unit at the first time point together with the time data of the first time point.

4. The gas laser system according to claim 3, wherein the controller executes storage processing so that the nonvolatile storage unit periodically stores the physical amount detected by the physical amount detection unit together with the time data, and cancels the storage processing when the reduction of the supplied power is detected by the power reduction detection unit.

5. The gas laser system according to claim 3, wherein
   the physical amount detection unit detects gas pressure of laser gas in the laser oscillator,
   the nonvolatile storage unit stores gas pressure at the first time point detected by the physical amount detection unit, and
   the controller controls, based on the gas pressure at the first time point stored in the nonvolatile storage unit, the gas pressure to target gas pressure after recovery of the power supplied from the power source unit, and permits a discharging operation of the laser oscillator after the gas pressure is controlled to the target gas pressure.

6. The gas laser system according to claim 1, wherein
   the device includes a first device and a second device, a first standby time being needed until the first device normally starts an operation after the first device stops an operation due to the reduction of the power supplied from the power source unit, a second standby time being needed until the second device normally starts an operation after the second device stops an operation due to the reduction of the power supplied from the power source unit, and
   the controller inhibits resumption of the operation of the first device when the time from the first time point to the second time point is within the first standby time, and inhibits resumption of the operation of the second device when the time from the first time point to the second time point is within the second standby time.

* * * * *